United States Patent
Heo

(10) Patent No.: US 11,081,952 B2
(45) Date of Patent: Aug. 3, 2021

(54) VOICE COIL MOTOR ACTUATOR AND METHOD

(71) Applicant: SAMSUNG ELECTRO-MECHANICS CO., LTD., Suwon-si (KR)

(72) Inventor: Chang Jae Heo, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 1098 days.

(21) Appl. No.: 15/496,110

(22) Filed: Apr. 25, 2017

(65) Prior Publication Data

US 2018/0048222 A1 Feb. 15, 2018

(30) Foreign Application Priority Data

Aug. 11, 2016 (KR) .......................... 10-2016-0102512

(51) Int. Cl.
*H02K 41/035* (2006.01)
*H04N 5/232* (2006.01)
(Continued)

(52) U.S. Cl.
CPC ........... *H02K 41/0354* (2013.01); *G02B 7/04* (2013.01); *G02B 7/09* (2013.01); *G02B 13/0015* (2013.01);
(Continued)

(58) Field of Classification Search
CPC ........ H02K 41/0354; G02B 7/04; G02B 7/09; G02B 13/0015; G02B 7/08; H04N 5/2254;
(Continued)

(56) References Cited

U.S. PATENT DOCUMENTS

2004/0179285 A1 9/2004 Ogasawara et al.
2008/0031616 A1* 2/2008 Sasamoto ................ G03B 9/08
396/463
(Continued)

FOREIGN PATENT DOCUMENTS

CN 1969229 A 5/2007
CN 1505031 A 6/2007
(Continued)

OTHER PUBLICATIONS

Translation of CN 104880964A has been attached.*
(Continued)

*Primary Examiner* — Zoheb S Imtiaz
(74) *Attorney, Agent, or Firm* — NSIP Law

(57) ABSTRACT

An actuator driver for a voice coil motor (VCM) includes a digital converter configured to convert a VCM driving control code into a plurality of conversion codes including at least a first to nth conversion codes, during a predetermined period of time, a digital-to-analog converter configured to sequentially generate an analog signal according to each of the plurality of conversion codes during the predetermined time to actuate a VCM actuator to a target position, and a current amplifier configured amplify the analog signal to generate a driving signal and provide the driving signal to the VCM actuator, wherein the sequential generation of the analog signal includes increasing a level of the analog signal in response to one of the conversion codes and decreasing a level of the analog signal in response to another one of the conversion codes.

33 Claims, 8 Drawing Sheets

(51) Int. Cl.
  *G02B 7/04* (2021.01)
  *G02B 7/09* (2021.01)
  *G02B 13/00* (2006.01)
  *H04N 5/225* (2006.01)
  *G02B 7/08* (2021.01)

(52) U.S. Cl.
  CPC ........... *H04N 5/2254* (2013.01); *H04N 5/232* (2013.01); *H04N 5/23212* (2013.01); *H04N 5/23241* (2013.01); *G02B 7/08* (2013.01)

(58) Field of Classification Search
  CPC . H04N 5/232; H04N 5/23212; H04N 5/23241
  See application file for complete search history.

(56) References Cited

U.S. PATENT DOCUMENTS

| | | | |
|---|---|---|---|
| 2010/0124411 | A1 | 5/2010 | Hirayama |
| 2010/0164567 | A1* | 7/2010 | Kim ................... G11C 5/145 327/153 |
| 2011/0156763 | A1 | 6/2011 | Gao et al. |
| 2011/0158461 | A1 | 6/2011 | Ko et al. |
| 2011/0304285 | A1 | 12/2011 | Shimazaki et al. |
| 2012/0161687 | A1 | 6/2012 | Arai et al. |
| 2014/0009089 | A1 | 1/2014 | Oh et al. |
| 2014/0126923 | A1 | 5/2014 | Mizutani |
| 2015/0116579 | A1 | 4/2015 | Zhang et al. |
| 2016/0036370 | A1 | 2/2016 | Kang |

FOREIGN PATENT DOCUMENTS

| | | | |
|---|---|---|---|
| CN | 101738819 A | | 6/2010 |
| CN | 103532470 A | | 1/2014 |
| CN | 103620477 A | | 3/2014 |
| CN | 104880964 A | * | 1/2015 |
| CN | 104880964 A | | 9/2015 |
| EP | 2 434 487 A1 | | 3/2012 |
| JP | 2000-37091 A | | 2/2000 |
| JP | 2013-226010 A | | 10/2013 |
| KR | 10-0968851 B1 | | 7/2010 |
| KR | 10-1257200 B1 | | 4/2013 |
| KR | 10-2016-0015075 A | | 2/2016 |

OTHER PUBLICATIONS

Liu Hongfei et al. "Research on Control System of Piezoelectric Actuator" *China Academic Journal Electronic Publishing House,* Electronic Sci. & Tech. /Nov. 15, 2014.

Prasanna Deshmukh et al. "Precision Controller for Segmented Mirror Telescope Actuator: Control and Tuning" *2016 Indian Control Conference* (ICC) Indian Institute of Technology Hyderabad Jan. 4-6, 2016. Hyderabad, India.

Chinese Office Action dated Aug. 21, 2020 in corresponding Chinese Patent Application No. 201710455662.1 (10 pages in English, 11 pages in Chinese).

Korean Office Action dated Jun. 19, 2017 in Counterpart Korean Application No. 10-2016-0102512 (8 pages with English translation).

* cited by examiner

VOICE COIL MOTOR ACTUATOR AND METHOD

CROSS-REFERENCE TO RELATED APPLICATIONS

This application claims the benefit under 35 USC 119(a) of Korean Patent Application No. 10-2016-0102512 filed on Aug. 11, 2016 in the Korean Intellectual Property Office, the entire disclosure of which is incorporated herein by reference for all purposes.

BACKGROUND

1. Field

The following description relates to a voice coil motor (VCM) actuator driver and method.

2. Description of Related Art

In general, voice coil motors (VCMs) may be used for auto focusing in a camera module included in a mobile electronic device, such as a mobile phone, or the like.

VCMs may be driven by an electric current, and VCM actuators may be driven by a driving current. The position of lens in the camera module may be adjusted by driving such VCM actuators.

SUMMARY

This Summary is provided to introduce a selection of concepts in a simplified form that are further described below in the Detailed Description. This Summary is not intended to identify key features or essential features of the claimed subject matter, nor is the Summary intended to be used as an aid in determining the scope of the claimed subject matter.

In one general aspect, an actuator driver for a voice coil motor (VCM) includes a digital converter configured to convert a VCM driving control code into a plurality of conversion codes including at least a first to nth conversion codes, during a predetermined period of time, a digital-to-analog converter configured to sequentially generate an analog signal according to each of the plurality of conversion codes during the predetermined time to actuate a VCM actuator to a target position, and a current amplifier configured amplify the analog signal to generate a driving signal and provide the driving signal to the VCM actuator, wherein the sequential generation of the analog signal includes increasing a level of the analog signal in response to one of the conversion codes and decreasing a level of the analog signal in response to another one of the conversion codes.

The digital converter may convert the VCM driving control code into the first to nth conversion codes when the VCM driving control code changes and convert the VCM driving code into a starting conversion code when the VCM driving code is maintained from a previous actuation, where the starting conversion code may have a code value different from code values of the first to nth conversion codes.

The plurality of conversion codes may include a first conversion code, a second conversion code, a third conversion code, a fourth conversion code, and a fifth conversion code, wherein, in the digital-to-analog converter, provision times of the first conversion code, the second conversion code, the third conversion code, the fourth conversion code, and the fifth conversion code may be provided as T0, T1, T2, T3, and T4, respectively, wherein a difference between the first conversion code and the starting conversion code may be set as a first difference code a1, a difference between the first conversion code and the second conversion code may be set as a second difference code a2, a difference between the third conversion code and the second conversion code may be set as a third difference code a3, a difference between the third conversion code and the fourth conversion code may be set as a fourth difference code a4, and a difference between the fifth conversion code and the fourth conversion code may be set as a fifth difference code a5, and wherein relationships among the first through fifth difference codes may be set according to the expressions:

$$a3=a1+a4;$$

$$a5=a4+a1-a2;$$

$a1-a2+a3-a4+a5=$a target code corresponding to the target position−the starting conversion code; and $3*a1-2*a2+a4=$the target code−the starting conversion code.

The first through nth conversion codes may be at least one of a current increase code, controlling an increasing of a level of the analog signal, and a current reduction code, controlling a reducing of a level of the analog signal, and a conversion code may be the current increase code when a value of the conversion code is greater than a value of an immediately previous conversion code, and the conversion code may be the current reduction code when the value of the conversion code is less than the value of the immediately previous conversion code.

The plurality of conversion codes may include the first conversion code, the second conversion code, the third conversion code, the fourth conversion code, and the fifth conversion code, the first conversion code, the third conversion code, and the fifth conversion code may be current increase codes, and the second conversion code and fourth conversion code may be current reduction codes, and the digital-to-analog converter may generate the analog signal according to the first conversion code, the second conversion code, the third conversion code, the fourth conversion code, and the fifth conversion code, in sequence, during the predetermined time.

A difference between the first conversion code and a starting conversion code may be a first difference a1, a difference between the first conversion code and the second conversion code may be a2, a difference between the third conversion code and the second conversion code may be a3, a difference between the third conversion code and the fourth conversion code may be a4, and a difference between the fifth conversion code and the fourth conversion code may be a5, and relationships among the a1, a2, a3, a4, and a5 may be constrained according to the expressions:

$$a3=a1+a4; \text{ and}$$

$$a5=a4+a1-a2.$$

The plurality of conversion codes may include the first conversion code, the second conversion code, the third conversion code, the fourth conversion code, and the fifth conversion code, the first conversion code and the third conversion code may be current reduction codes, and the second conversion code, the fourth conversion code, and the fifth conversion code may be current increase codes, and the digital-to-analog converter may generate the analog signal according to the first conversion code, the second conversion code, the third conversion code, the fourth conversion code, and the fifth conversion code, in sequence, during the predetermined time.

A difference between the first conversion code and a starting conversion code may be a1, a difference between the first conversion code and the second conversion code may be a2, a difference between the third conversion code and the second conversion code may be a3, a difference between the third conversion code and the fourth conversion code may be a4, and a difference between the fifth conversion code and the fourth conversion code may be a5, and relationships among the a1, a2, a3, a4, and a5 may be constrained according to the expressions:

$$a3=a1+a4; \text{ and}$$

$$a5=a4+a1-a2.$$

The plurality of conversion codes may include the first conversion code, the second conversion code, the third conversion code, the fourth conversion code, and the fifth conversion code, the first conversion code, the third conversion code, and the fourth conversion code may be current increase codes, and the second conversion code and the fifth conversion code may be current reduction codes, and the digital-to-analog converter may generate the analog signal according to the first conversion code, the second conversion code, the third conversion code, the fourth conversion code, and the fifth conversion code, in sequence, during the predetermined time.

A difference between the first conversion code and a starting conversion code may be a1, a difference between the first conversion code and the second conversion code may be a2, a difference between the third conversion code and the second conversion code may be a3, a difference between the third conversion code and the fourth conversion code may be a4, and a difference between the fifth conversion code and the fourth conversion code may be a5, and relationships among the a1, a2, a3, a4, and a5 may be constrained according to the expressions:

$$a3=a1+a4; \text{ and}$$

$$a5=a4+a1-a2.$$

The predetermined period of time may correspond to a period of a natural vibration of the VCM actuator.

The actuator driver may further include the VCM actuator.

In one general aspect, a method of driving a VCM actuator includes converting a VCM driving control code into a plurality of conversion codes including at least first through nth conversion codes, during a predetermined period of time, sequentially generating an analog signal according to each of the plurality of conversion codes during the predetermined period of time to actuate a VCM actuator to a target position, and providing a driving signal to the VCM actuator after the driving signal is generated by an amplifying of the analog signal to generate the driving signal, wherein the sequential generation of the analog signal includes increasing a level of the analog signal in response to one of the conversion codes and decreasing a level of the analog signal in response to another one of the conversion codes.

The converting of the VCM driving control code may include converting the VCM driving control code into the first to nth conversion codes when the VCM driving control code changes and include converting the VCM driving code into a starting conversion code when the VCM driving code is maintained from a previous actuation, where the starting conversion code may have a code value different from code values of the first to nth conversion codes.

The plurality of conversion codes may include a first conversion code, a second conversion code, a third conversion code, a fourth conversion code, and a fifth conversion code, where, in the converting of the VCM driving control code, provision times of the first conversion code, the second conversion code, the third conversion code, the fourth conversion code, and the fifth conversion code may be provided as T0, T1, T2, T3, and T4, respectively, and where a difference between the first conversion code and the starting conversion code may be set as a first difference code a1, a difference between the first conversion code and the second conversion code may be set as a second difference code a2, a difference between the third conversion code and the second conversion code may be set as a third difference code a3, a difference between the third conversion code and the fourth conversion code may be set as a fourth difference code a4, and a difference between the fifth conversion code and the fourth conversion code may be set as a fifth difference code a5, and relationships among the first through fifth difference codes may be set according to the expressions:

$$a3=a1+a4;$$

$$a5=a4+a1-a2;$$

$$a1-a2+a3-a4+a5=\text{a target code corresponding to the target position—the starting conversion code;}$$
and $$3*a1-2*a2+a4=\text{the target code–the starting conversion code.}$$

The first through nth conversion codes may be at least one of a current increase code, controlling an increasing of a level of the analog signal, and a current reduction code, controlling a reducing of a level of the analog signal, and a conversion code may be the current increase code when a value of the conversion code is greater than a value of an immediately previous conversion code, and the conversion code may be the current reduction code when the value of the conversion code is less than the value of the immediately previous conversion code.

The plurality of conversion codes may include the first conversion code, the second conversion code, the third conversion code, the fourth conversion code, and the fifth conversion code, the first conversion code, the third conversion code, and the fifth conversion code may be current increase codes, and the second conversion code and fourth conversion code may be current reduction codes, and the converting of the VCM driving control code may include generating the analog signal according to the first conversion code, the second conversion code, the third conversion code, the fourth conversion code, and the fifth conversion code, in sequence, during the predetermined time.

A difference between the first conversion code and a starting conversion code may be a1, a difference between the first conversion code and the second conversion code may be a2, a difference between the third conversion code and the second conversion code may be a3, a difference between the third conversion code and the fourth conversion code may be a4, and a difference between the fifth conversion code and the fourth conversion code may be a5, and relationships among the a1, a2, a3, a4, and a5 may be constrained according to the expressions:

$$a3=a1+a4; \text{ and}$$

$$a5=a4+a1-a2.$$

The plurality of conversion codes may include the first conversion code, the second conversion code, the third conversion code, the fourth conversion code, and the fifth conversion code, the first conversion code and the third conversion code may be current reduction codes, and the second conversion code, the fourth conversion code, and the fifth conversion code may be current increase codes, and the converting of the VCM driving control code may include generating the analog signal according to the first conversion code, the second conversion code, the third conversion code, the fourth conversion code, and the fifth conversion code, in sequence, during the predetermined time.

A difference between the first conversion code and a starting conversion code may be a1, a difference between the first conversion code and the second conversion code may be a2, a difference between the third conversion code and the second conversion code may be a3, a difference between the third conversion code and the fourth conversion code may be a4, and a difference between the fifth conversion code and the fourth conversion code may be a5, and relationships among the a1, a2, a3, a4, and a5 may be constrained according to the expressions:

$$a3=a1+a4; \text{ and}$$

$$a5=a4+a1-a2.$$

The plurality of conversion codes may include the first conversion code, the second conversion code, the third conversion code, the fourth conversion code, and the fifth conversion code, the first conversion code, the third conversion code, and the fourth conversion code may be current increase codes, and the second conversion code and the fifth conversion code may be current reduction codes, and the converting of the VCM driving control code may include generating the analog signal according to the first conversion code, the second conversion code, the third conversion code, the fourth conversion code, and the fifth conversion code, in sequence, during the predetermined time.

A difference between the first conversion code and a starting conversion code may be a1, a difference between the first conversion code and the second conversion code may be a2, a difference between the third conversion code and the second conversion code may be a3, a difference between the third conversion code and the fourth conversion code may be a4, and a difference between the fifth conversion code and the fourth conversion code may be a5, and relationships among the a1, a2, a3, a4, and a5 may be constrained according to the expressions:

$$a3=a1+a4; \text{ and}$$

$$a5=a4+a1-a2.$$

The predetermined period of time may correspond to a period of a natural vibration of the VCM actuator.

In one general aspect, a non-transitory computer-readable storage medium is included storing instructions that, when executed by a processor, cause the processor to perform any or any combination of the methods described herein.

In one general aspect, an actuator driver for a voice coil motor (VCM) includes a digital-to-analog converter configured to, in response to a VCM current control value, sequentially generate an analog signal according to each of a plurality of VCM driving current values respectively derived based on the VCM current control value, during a predetermined time to actuate a VCM actuator to a target position, and a current amplifier configured amplify the analog signal to generate a driving signal and provide the driving signal to the VCM actuator, wherein, the sequential generation of the analog signal includes increasing a level of the analog signal in response to one of the VCM driving current values and decreasing a level of the analog signal in response to another of the VCM driving current values during the predetermined time.

The predetermined time may be based on a period of a natural transient of the VCM actuator, and output transient characteristics of the VCM actuator may become zeroed out by the provided driving signal before expiration of a first period T of the natural transient of the VCM actuator immediately after an initial time T0 when the driving signal is provided to the VCM actuator in response to the VCM current control value.

The plurality of VCM driving current values may be generated during the predetermined time in T/6 intervals, so the output transient characteristics of the VCM actuator become zeroed out before a time 5T/6 after T0.

The actuator driver may further include a digital converter configured to generate from the VCM current control value the plurality of VCM driving current values during the predetermined time, including generating a first conversion value, a second conversion value, a third conversion value, a fourth conversion value, and a fifth conversion value, where a difference between the first conversion value and the immediately previous value of the VCM current control value may be a1, a difference between the first conversion value and the second conversion value may be a2, a difference between the third conversion value and the second conversion value may be a3, a difference between the third conversion value and the fourth conversion value may be a4, and a difference between the fifth conversion value and the fourth conversion value may be a5, and relationships among the a1, a2, a3, a4, and a5 may be constrained based on the expressions:

$$a3=a1+a4; \text{ and}$$

$$a5=a4+a1-a2.$$

Other features and aspects will be apparent from the following detailed description, the drawings, and the claims.

BRIEF DESCRIPTION OF DRAWINGS

Throughout the drawings and the detailed description, the same reference numerals refer to the same or like elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features and constructions that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The features of the examples described herein may be combined in various ways as will be apparent after an understanding of the disclosure of this application. Further, although the examples described herein have a variety of configurations, other configurations are possible as will be apparent after an understanding of the disclosure of this application.

Figure 1:
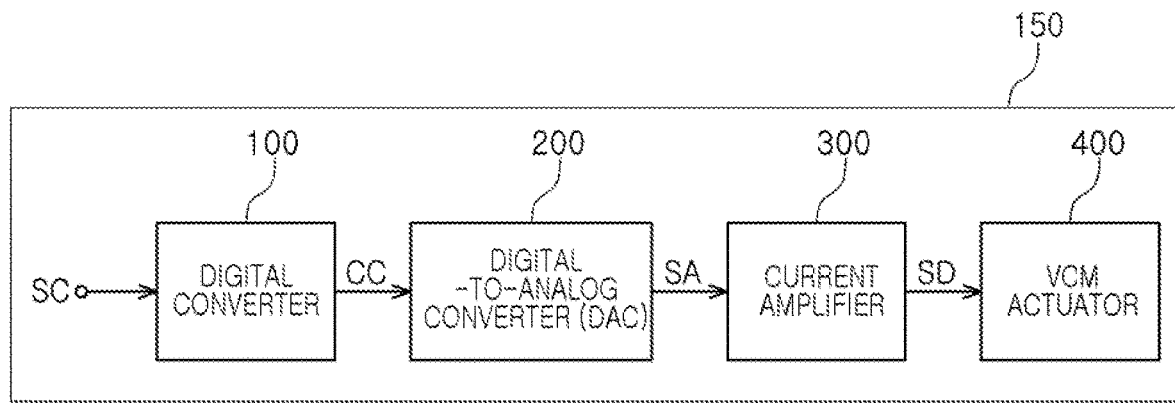
FIG. 1 is a block diagram of an actuator driver system for a voice coil motor (VCM) according to an example.

FIG. 1 is a block diagram of an actuator driver system 150 for a voice coil motor (VCM) according to an example. The actuator driver system 150 may be device, such as a camera module with actuated lens or mobile (or stationary) device that includes such a camera module, as only examples.

The actuator driver system 150, according to an example, may include a digital converter 100, a digital-to-analog converter 200, and a current amplifier 300. As noted below, and only as examples, the actuator driver system 150 may further include a VCM actuator 400, include the VCM actuator 400 and be representative of a camera module, or include such a camera module and be representative of a mobile (or stationary) device that initiates actuation changes, such as through controlled auto-focus operations, of the VCM actuator as discussed herein and according to one or more embodiments. Though such examples of the actuator driver system 150 have been provided, alternate embodiments are also available.

In an example, each of the digital converter 100, the digital-to-analog converter 200, and the current amplifier 300 may be implemented as an independent signal processor or a circuit, or may be implemented collectively as a single signal processor, noting that alternative embodiments are also available.

The digital converter 100 may convert a control code SC into respective conversion codes CC. The control signal SC may have two or more states. In an example, the control code SC may have two states, including an initial state represented by an initial control code SC0 and a first state represented by a first control code SC1. An example of a conversion of a control code SC into such respective conversion codes will be described in greater detail further below with respect to FIG. 2.

The digital-to-analog converter 200 may generate respective analog signals S1 through Sn based on the conversion codes CC, and output an analog signal SA by combining or sequentially applying the generated signals S1 through Sn, or generate and output the analog signal SA so as to have a shape, timing, and configuration corresponding to such a combination or sequence of such analog signals as discussed herein, as only examples. An example of a generation of an analog signal SA from respective considerations of such plural conversion codes CC will be described with greater detail further below with reference to FIG. 3.

The current amplifier 300 may amplify an electric current of the analog signal SA of the digital-to-analog converter 200 to generate a driving signal SD and provide the driving signal SD to the VCM actuator 400.

In addition, in an example, the actuator driver for a VCM may further include the VCM actuator 400. Here, the VCM actuator 400 may be an actuator device that is configured to interact with lens(es) of the example camera module, as only an example, or the actuator device and the example lens(s) in combination, depending on embodiment. The VCM actuator 400 may be driven, according to the driving signal SD of the current amplifier 300, and may adjust a lens position.

Figure 2:
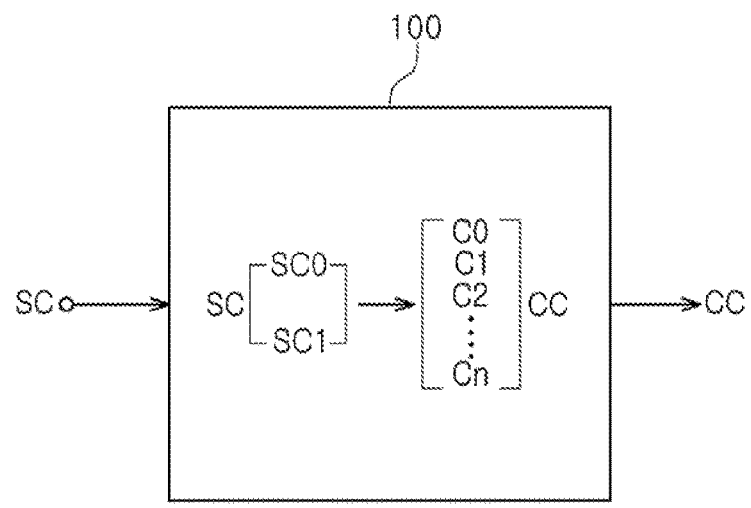
FIG. 2 is a view illustrating an operation of a digital converter according to an example.

FIG. 2 is a view illustrating an operation of a digital converter 100 according to an example. The digital converter 100 of FIG. 2 may correspond to the digital converter 100 of FIG. 1, though embodiments of FIG. 1 and FIG. 2 are not limited thereto.

Here, for example, the digital converter 100 may convert a control code SC into a plurality of conversion codes CC, e.g., including a starting conversion code C0 and a first conversion code C1 through an nth conversion code Cn, where n is a natural number of 2 or more, during a predetermined period of time T. In an example, when the control code SC changes from the initial control code SC0 to the first control code SC1, the digital converter 100 may begin converting the first control code SC1 of a first control state into the respective conversion codes C1 through Cn in sequence within the example predetermined period of time T, e.g., so an output conversion code CC from the digital converter 100 incrementally changes during the predetermined period of time T. The values represented by the conversion codes CC will depend on the control code SC. For example, the conversion codes C1 through Cn may be controlled to represent respective driving values between the driving values respectively represented by the initial control code SC0 and the first control code SC1. In an example, the predetermined period of time T may be or depend on a predetermined, expected, or estimated vibration period of the VCM actuator, such as a natural vibration period of the VCM actuator. Information regarding the vibration period of the VCM actuator may be stored in a look-up table of the actuator driver system 150, such as in a memory further represented by the digital converter 100.

In these examples, the first conversion code C1 through the nth conversion code Cn, among the plurality of conversion codes CC, may have code values that are different from the code value of the starting conversion code C0.

In an example, each of the first conversion code C1 through the nth conversion code Cn, among the plurality of conversion codes CC, may be provided as one of a current increase code value that increases, from an immediately previous level or level corresponding to an immediately previous conversion code, a level of an electric current to be provided to the VCM actuator as a driving current, and a current reduction code value that reduces, from the immediately previous level or level corresponding to the immediately previous conversion code, the level of the electric current. The respectively controlled electric currents, corresponding to the first conversion code C1 through the nth conversion code Cn, among the plurality of conversion codes CC, may be different from a starting controlled current corresponding to the starting conversion code C0, for example.

It is found that lenses whose position are adjusted according to typical position adjustment instruction and corresponding driving current applied to a VCM actuator may vibrate or oscillate according to the natural vibration frequency of the VCM actuator. It is also found that a relatively long time may typically be required to accomplish the desired or settled position adjustment with such a typical position adjustment instruction or driving current, such as at least until the lenses are stably disposed at the target position after the vibrations have subsided.

Hereinafter, in respective examples in the present disclosure, unnecessary overlapping descriptions for the same or like components denoted by the same reference numerals and/or having or performing the same or like functions or operations as previously described may be subsequently omitted in some of the following discussions, while example contents different from such overlapping descriptions may be described in greater detail in such subsequent discussions, noting that such example contents are only meant to be examples and embodiments are not limited to the same.

Returning to FIG. 1, and similar to the digital converter 100 of FIGS. 1 and 2, the digital-to-analog converter 200 and the current amplifier 300 may be collectively or respectively implemented by hardware components, such as a hardware DAC and/or other hardware amplifier implementations. Operations of the digital converter 100, digital-to-analog converter 200, and/or the current amplifier of FIG. 1 may also, or alternatively, be implemented through such hardware components and/or instructions stored in/on a non-transitory computer readable medium included in and represented by the illustrated actuator driver system 150, such that, when executed by one or more processors, causes the one or more processors to implement or control respective operations of the digital-to-analog converter 200 and/or the current amplifier 300.

Figure 3:
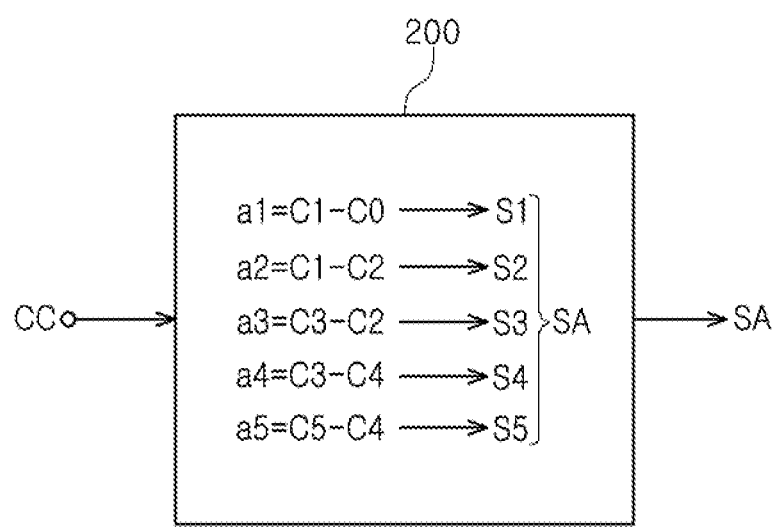
FIG. 3 is a view illustrating an operation of a digital-to-analog converter according to an example.

FIG. 3 is a view illustrating an operation of a digital-to-analog converter 200 according to an example. The digital-to-analog converter 200 of FIG. 3 may correspond to the digital-to-analog converter 200 of FIG. 1, though embodiments of FIG. 1 and FIG. 3 are not limited thereto.

Figure 4:
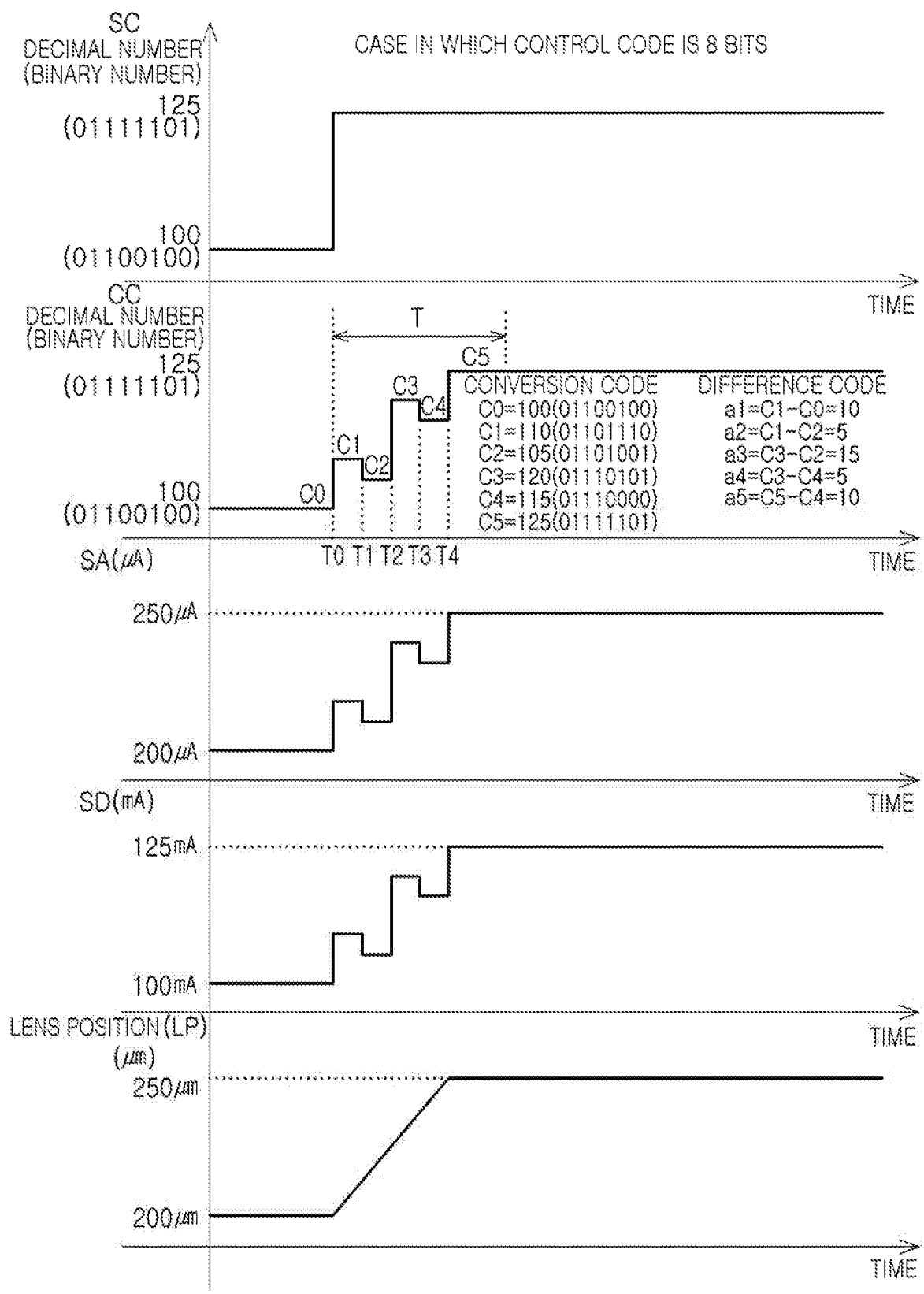
FIG. 4 is a timing chart of a control code, a conversion code, an analog signal, a driving signal, and a lens position according to an example.

With reference to FIG. 3, and only as an example, in the digital-to-analog converter 200, a difference (C1-C0) between the first conversion code C1 and the starting conversion code C0 may be set or determined, as a first difference code a1; a difference (C1-C2) between the first conversion code C1 and a second conversion code C2 may be set or determined, as a second difference code a2; a difference (C3-C2) between a third conversion code C3 and the second conversion code C2 may be set or determined, as a third difference code a3; a difference (C3-C4) between the third conversion code C3 and a fourth conversion code C4 may be set or determined, as a fourth difference code a4; and a difference (C5-C4) between a fifth conversion code C5 and the fourth conversion code C4 may be set or determined, as a fifth difference code a5. Such difference codes a1 through a5 are also illustrated in FIG. 4, discussed in greater detail further below. Though the example difference codes a1-a5 have been discussed as having been determined by the digital-to-analog converter 200, one or more or all of such difference code settings or determinations may alternatively be performed by the digital converter, such as the digital converter 100 of FIG. 1 or 2.

The digital-to-analog converter 200 may generate the analog signal SA as the first through fifth signals S1 to S5, for example, using the respectively determined first difference code a1, second difference code a2, third difference code a3, fourth difference code a4, and fifth difference code a5. For example, as illustrated in FIG. 4, the analog signal SA may be sequentially or incrementally built by timed or delayed generations, substitutions, or additions corresponding to the respective first through fifth signals S1 through S5 over the predetermined period of time T of FIG. 4. As an alternative, the first through fifth signals S1 to S5 may be generated directly from the corresponding conversion codes C1 through C5, e.g., without determinations of the corresponding difference code a1 through a5 or their corresponding difference/change values. The difference codes a1 through a5 may represent respective incrementing (or decrementing) values from a corresponding previous conversion code value, such that the digital-to-analog converter 200 may generate a current analog signal by increasing or decreasing, according to the difference code. For example, if the digital-to-analog converter 200 was immediately previously receiving the starting conversion code C0 the digital-to-analog converter 200 would have been generating a previous analog signal SA corresponding to the starting conversion code C0, e.g., based on a previous sequencing through conversion codes for generating the previous analog signal SA. The digital-to-analog converter 200 may, thus, receive the first conversion code C1 and set or determine the corresponding difference code a1 and increment (or decrement) the previous analog signal SA according to difference code a1 and output the new analog signal SA. In this example, the starting conversion code C0 may have corresponded to a previous desired or set positioning of the VCM actuator 400, e.g., for a previous set lens positioning.

FIG. 4 is a timing chart for an example of a control code SC, example conversion codes CC, an example resulting incrementing and decrementing analog signal SA, an example resulting incrementing and decrementing driving signal SD, and an example resulting lens position according to an example.

With reference to FIG. 4, in an example, in a case in which the conversion codes CC includes the starting conversion code C0 and the first conversion code C1 through a fifth conversion code C5, a digital converter 100, such as the digital converter 100 of FIG. 1 or 2, may respectively convert the control code SC into the plurality of conversion codes CC, including the starting conversion code C0 and the first conversion code C1 through the fifth conversion code C5 over the predetermined period of time T.

In an example, the first conversion code C1 through the fifth conversion code C5, among the plurality of conversion codes CC, have respective corresponding code values that are different from the code value of the starting conversion code C0.

In a case in which the control code SC is changed from an initial code SC0 to a first control code SC1, the conversion code CC may be changed from the starting conversion code C0 to the first conversion code C1, the second conversion code C2, the third conversion code C3, the fourth conversion code C4, and the fifth conversion code C5, in sequence. In an example, a current starting conversion code C0 may also represent or correspond to a previous applied conversion code C5 for a previous control code SC1 for a previous lens position setting, for example, such that when a new lens position is desired corresponding to the control code SC1 illustrated in FIG. 4, the previous applied conversion code C5 can now be considered to be the starting conversion code C0 for the changed new lens position of FIG. 4, with this starting conversion code C0 then being changed to the first conversion code C1, the second conversion code C2, the third conversion code C3, the fourth conversion code C4, and the fifth conversion code C5, in sequence, to change the position of the lens to the new lens position.

In the case of the digital-to-analog converter, such as the digital-to-analog converter 200 of FIG. 1 or 3, the first conversion code C1, the second conversion code C2, the third conversion code C3, the fourth conversion code C4, and the fifth conversion code C5 may be set to be respectively provided, and accordingly provided, at times T0, T1, T2, T3, and T4, respectively. In an example, the times T0 through T4 may all be within the predetermined period of time T corresponding to the natural frequency of the VCM actuator, for example. In an example, T0 corresponds to time T/6, T1 corresponds to time 2T/6, T3 corresponds to time 3T/6, and T4 corresponds to time 4T/6. As only examples, relationships or constraints among the example aforementioned first difference code a1, second difference code a2, third difference code a3, fourth difference code a4, and fifth difference code a5 may be set according to the below Formulas 1-3.

$$a3 = a1 + a4 \qquad \text{Formula 1}$$

$$a5 = a4 + a1 - a2 \qquad \text{Formula 2}$$

$$a1 - a2 + a3 - a4 + a5 = \text{Target Code Value (SC1-SC0)} \qquad \text{Formula 3}$$

Here, Formula 3 is also representative of the example operation of the digital-to-analog converter 200 discussed above with respect to FIG. 3, where the second difference code a2 corresponds to correction codes C1-C2 and the fourth difference code a4 corresponds to the correction codes C3-C4, e.g., while the first difference code al corresponding to correction code C1-C0 (e.g., with correction code C0 having the same value as the initial code SC0) and the fifth difference code a5 corresponding to correction codes C5-C4 (e.g., with correction code C5 having a same value as the first control code SC1). The digital-to-analog converter may utilize such relationship settings or constraints according to Formulas 1 and 2 with Formula 3, to define a relationship among the first difference code a1, the second difference code a2, and the fourth difference code a4, without the third difference code a3 and fifth difference code a5, as shown in the below Formula 4, for example.

$$3*a1 - 2*a2 + a4 = \text{Target Code Value} \qquad \text{Formula 4}$$

In the below example, a case in which the control code SC and the conversion codes CC are configured to have 8-bits, or be respective 8-bit codes, will be described, noting that this example is simply for the sake of convenience of explanation, and the control code SC and the conversion codes CC are not required to have 8-bits or be 8-bit codes.

The example initial code SC0 and first control code SC1 of the control code SC, example starting conversion code C0, example first conversion codes C1 to C5, and example first difference codes a1 through a5 discussed above with regard to FIG. 4 are also demonstrated in Table 1 below.

TABLE 1

| Control Code (SC) | | Conversion Code (CC) | | |
|---|---|---|---|---|
| Code | 8-bit Binary Code (Decimal Value) | Code | 8-bit Binary Code (Decimal Value) | Difference Code And Decimal Value |
| SC0 | 0110 0100 (100) | C0 | 0110 0100 (100) | |
| SC1 | 0111 1101 (125) | C1 | 0110 1110 (110) | a1 = C1 − C0 = 10 |
| | | C2 | 0110 1001 (105) | a2 = C1 − C2 = 5 |
| | | C3 | 0111 0101 (120) | a3 = C3 − C2 = 15 |
| | | C4 | 0111 0000 (115) | a4 = C3 − C4 = 5 |
| | | C5 | 0111 1101 (125) | a5 = C5 − C4 = 10 |

Thus, as illustrated in Table 1, in a case in which the control code SC is changed from the initial code SC0 to the first control code SC1, the starting conversion code C0 of the conversion code CC may be changed to the first conversion code C1, the second conversion code C2, the third conversion code C3, the fourth conversion code C4, and the fifth conversion code C5, in sequence.

In an example, in a case in which the control code SC corresponds to the initial code SC0, e.g., 0110 0100 (100) or corresponding initial code state, and the initial code SC0 of the control code SC is changed or changes to the first control code SC1, e.g., 0111 1101 (125) or corresponding first control code state, the output conversion code CC may be changed from the starting conversion code C0 to the first conversion code C1, e.g., 0110 1110 (110), the second conversion code C2, e.g., 0110 1001 (105), the third conversion code C3, e.g., 0111 0101 (120), a fourth conversion code C4, e.g., 0111 0000 (115), and the fifth conversion code C5, e.g., 0111 1101 (125), in sequence.

In this example, the resulting first difference code a1, second difference code a2, third difference code a3, fourth difference code a4, and fifth difference code a5 may have values of 10, 5, 15, 5, and 10, respectively, satisfying the aforementioned example Formulas 1 through 4.

Subsequently, the digital-to-analog converter 200 may generate an analog signal SA in accordance with the first through fifth difference codes a1 through a5 based on the conversion code CC of the digital converter 100, e.g., thereby sequentially incrementing or decrementing the generated analog signal SA as the received conversion code CC changes from C0 to C5. In detail, a current waveform of the signal SA may be provided as a waveform having an initial current value corresponding the starting conversion code C0 and then current values corresponding to the first through fifth conversion codes C1 through C5 of the conversion code CC, such as at a starting level of 200 μA through 250 μA, as illustrated in FIG. 4.

Subsequently, in the current amplifier 300 and as illustrated in FIG. 4, the incrementally changed current of the signal SA, e.g., from 200 µA to 250 µA from the digital-to-analog converter 200 may be amplified to generate a driving signal SD having a corresponding driving current that ranges from 100 mA to 125 mA. The driving signal SD may be provided to a VCM actuator, such as the VCM actuator 400 of FIG. 1.

In this case, and as illustrated in FIG. 4, the VCM actuator 400 may be driven according to the driving signal SD of the current amplifier 300, so that a lens position may be quickly adjusted, such as with the illustrated 200 µm to 250 µm lens position adjustment, to the target position, by the VCM actuator. In an example, the digital converter 100 maintains provision of the fifth conversion code C5 after the illustrated T4 time, resulting in the digital-to-analog converter 200 maintaining a same analog signal according to the final set difference code, e.g., the fifth difference code a5, for continued amplification by the current amplifier 300 for fixing of a position of the lens by the VCM actuator 400.

Figure 6:
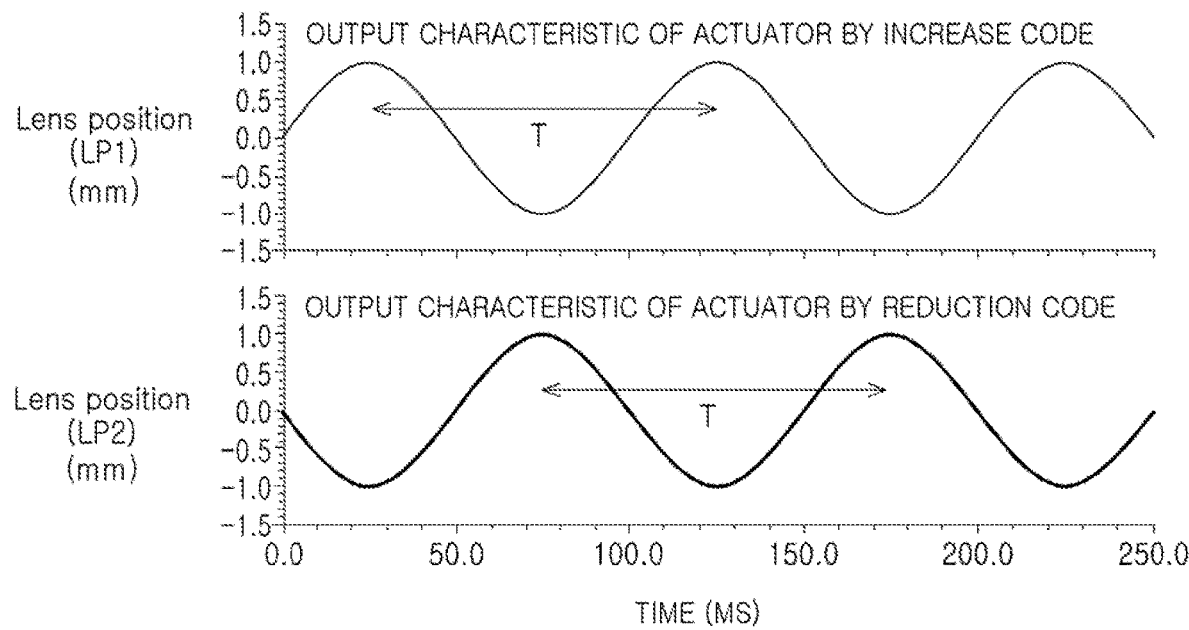
FIG. 6 is a waveform diagram illustrating unique natural output transient characteristics of an example VCM actuator according to an example.
Figure 7:
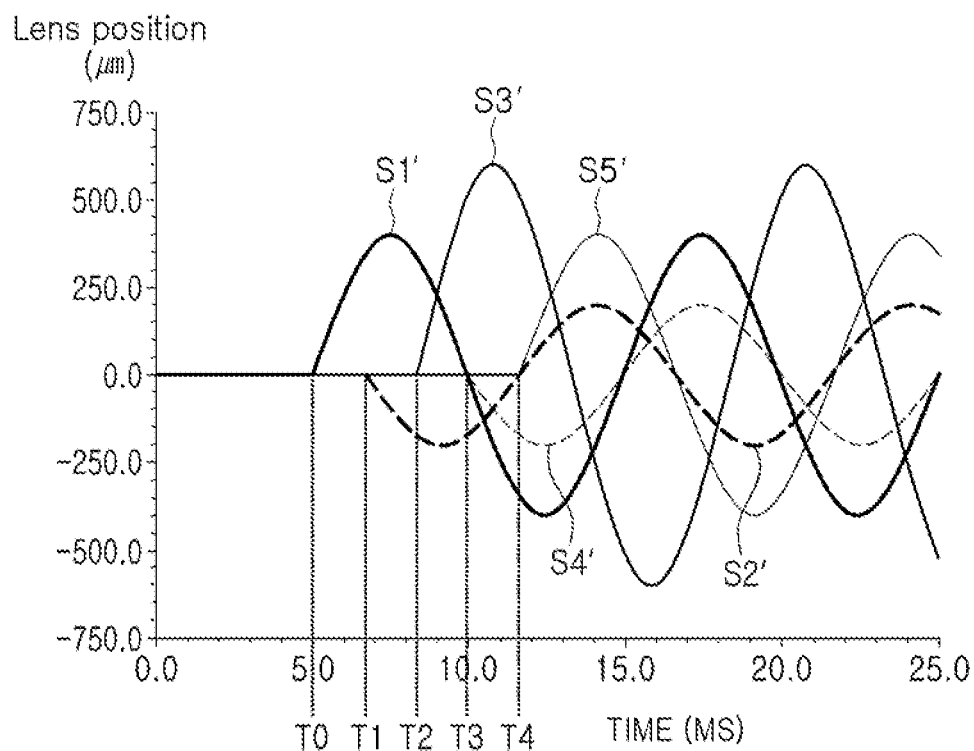
FIG. 7 is a signal waveform diagram separately representing respective output transient characteristics of the example VCM for different conversion codes according to an example.
Figure 8:
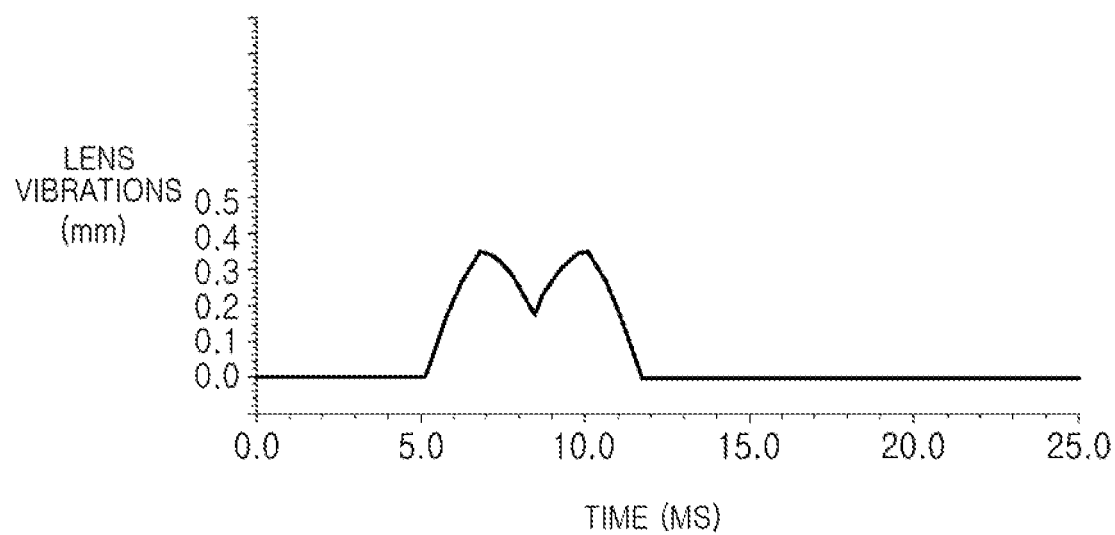
FIG. 8 is a graph illustrating a summed output transient characteristic of the example VCM with reduced lens vibrations according to an example.

Below, FIG. 5 will be discussed to demonstrate an example continued vibration or oscillation of a VCM actuator, e.g., according to its natural frequency and any dampening thereof, that may result in an extended settling time before the vibrations or oscillations subside. These vibrations or oscillations may also be considered as output transient characteristics of the VCM actuator. FIGS. 6-8 will be discussed to demonstrate that the aforementioned selective incrementing and decrementing of the generated VCM actuator driving signal, e.g., according to the constraints of Formulas 1-4, may reduce the generation of the natural vibrations or oscillations of the VCM actuator for the same target value.

Figure 5:
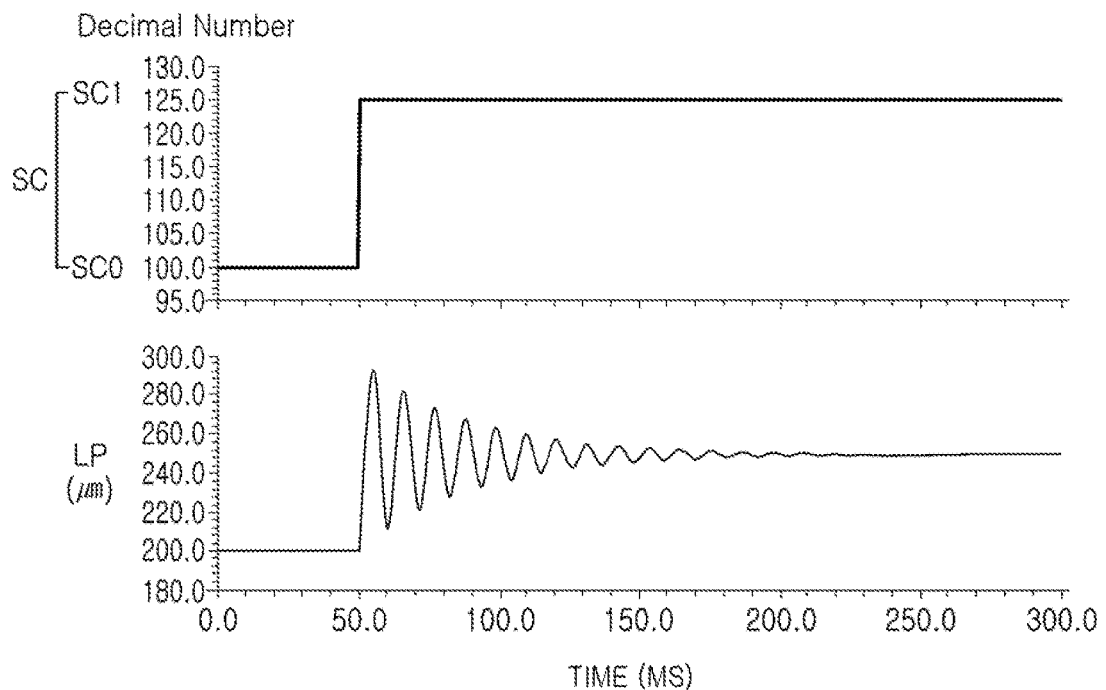
FIG. 5 is a view illustrating a control code and resulting lens positions of a VCM actuator according to an example.

Accordingly, FIG. 5 is a view illustrating a control code and resulting lens positions of a VCM actuator according to an example.

In a case in which a control code SC illustrated in FIG. 5 is not converted into a conversion code, and a target value step driving current for the VCM actuator is directly generated based on the control code SC, a lens whose position is adjusted by actuation of the VCM actuator operated by the driving current may continue to vibrate or oscillate according to a natural vibration frequency of the VCM actuator, so that a significant amount of time may have to elapse before the lens is stabilized accurately in a desired target position. For example, using the lens, a capturing of an image before the vibration has subsided will result in undesirable artifacts and blurriness, or the image will not be able to be captured until the vibration has subsided, which may be undesirable for fast image capturing or high speed repetition of image capturing.

Such a problem may be alleviated or the vibration effects reduced in one or more embodiments because the control code SC may not be directly used to generate the driving signal of the VCM actuator, but rather, various driving levels between a current level corresponding to the initial control code SC0 and the first control code SC1 may be provided as the driving signal of the VCM actuator, e.g., with the various driving levels including one or more decrements when the driving current is being increased overall or one or more increases when the driving current is being decreased overall. For example, the control code SC may be sequentially converted into a set of conversion codes, for an overall increase in driving current and which include at least one conversion code that results in a decrease in the driving current, as the driving signal is generated using difference codes corresponding to differences between the conversion codes, thereby suppressing or reducing vibrations of the VCM actuator. The conversion codes between the initial control code SC0 and the first control code SC1 may be set or selected based on one or more of the above example constraints of Formulas 1-4 and on the values the initial control code SC0 and the first control code SC1, for example, and a target value, as the difference between the initial control code SC0 and the first control code SC1.

FIG. 6 is a waveform diagram illustrating unique natural output characteristics of an example VCM actuator according to an example, FIG. 7 is a signal waveform diagram separately representing respective output transient characteristics of the example VCM for different example conversion codes, and FIG. 8 is a graph illustrating a summed output transient characteristic of the example VCM with reduced lens vibrations over time according to an example.

The graph of LP1 in FIG. 6 illustrates an lens position (LP1) waveform illustrating a unique natural output transient characteristic of the example VCM actuator according to a driving current derived from the analog signal generated by a digital-to-analog converter for a provided/set current increase code, e.g., a conversion code CC representing a current increase code, while the graph of LP2 illustrates an lens position (LP2) waveform illustrating a unique natural output characteristic of the example VCM actuator according to a driving current derived from the analog signal generated by the digital-to-analog converter for a provided/set current reduction code, e.g., a conversion code CC representing a current reduction code. Here, the waveforms LP1 and LP2 may be fed back positional measurements of the position of the lens or movement of the VCM actuator, for example. As demonstrated in FIG. 6, for the provided current increase code, the waveform for LP1 demonstrates a transient response with an opposite phase than the transient response of the waveform LP2 resulting from the provided current reduction code.

Accordingly, in view of the respective opposite phase output transient characteristics demonstrated in FIG. 6, FIG. 7 further demonstrates respective example output transient characteristic waveforms S1' through S5' that may result from respectively provided current increase codes and respectively provided current reduction codes, e.g., according to Formula 3 and as illustrated in FIG. 4. Accordingly, FIG. 7 separately illustrates an output transient characteristic of the example VCM for an increased applied driving current at time T0 corresponding to a current increase code as output transient characteristic waveform S1', an output transient characteristic of the example VCM for a decreased applied driving current at time T1 corresponding to a current reduction code as output transient characteristic waveform S2', an output transient characteristic of the example VCM for an increased applied driving current at time T2 corresponding to a current increase code as output transient characteristic waveform S3', an output transient characteristic of the example VCM for a decreased applied driving current at time T3 corresponding to a current reduction code as output transient characteristic waveform S4', and an output transient characteristic of the example VCM for an increased applied driving current at time T4 corresponding to a current increase code as output transient characteristic waveform S5', with the example output transient characteristic waveforms S2' and S4' demonstrating T/2 phase-shifted sine waveforms corresponding to the current reduction codes and as similarly demonstrated above in the discussion of FIG. 6.

FIG. 8 further demonstrates a summation of the separate output transient characteristic waveforms S1' through S5' of FIG. 7, representing that the sequencing of these driving current increments and decrements may result in a reduced output transient characteristic of the VCM actuator, and in particular a potential elimination of the output transient characteristic soon after time T4 before the first period of the natural output transient characteristic of the VCM would have occurred.

For example, each of example output transient characteristic waveform S1' through S5', at T/6 intervals and beginning at time T0, may be represented Formulas 5 to 9, described below.

$$S1'=a1'*\sin(t-T0) \quad \text{Formula 5}$$

$$S2'=a2'*\sin(t-T/2-T/6-T0) \quad \text{Formula 6}$$

$$S3'=a3'*\sin(t-2T/6-T0) \quad \text{Formula 7}$$

$$S4'=a4'*\sin(t-T/2-3T/6-T0) \quad \text{Formula 8}$$

$$S5'=a5'*\sin(t-4T/6-T0) \quad \text{Formula 9}$$

As discussed above, a final analog signal output from the digital-to-analog converter 200 may be provided as a signal obtained by combining or sequentially building the first signal S1, the second signal S2, the third signal S3, the fourth signal S4, and the fifth signal S5 based on the first through fifth conversion codes C1 through C5, such as further based on the corresponding first through fifth difference codes a1 through a5.

Accordingly, a summation of the output transient characteristic waveforms S1' through S5' may be expressed using the below Formula 10, for example.

$$S1'+S2'+S3'+S4'+S5' = a1'*\sin(t-T0) + \quad \text{Formula 10}$$
$$a2'*\sin(t-T/2-T/6-T0) + a3'*\sin(t-2T/6-T0) +$$
$$a4'*\sin(t-T/2-3T/6-T0) + a5'*\sin(t-4T/6-T0)$$

In addition, to demonstrate that if the example above constraints of Formulas 1 and 2 were applied when generating the analog signal by the digital-to-analog converter 200 and/or when setting the corresponding conversion codes CC, then reduced output transient characteristic would be available, the same above example constraints of Formulas 1 and 2 may be applied to the expression of Formula 10, as demonstrated in the below derived Formula 11.

$$S1'+S2'+S3'+S4'+S5' = \quad \text{Formula 11}$$
$$a1'*\sin(t-T0) + a2'*\sin(t-T/2-T/6-T0) +$$
$$(a1'+a4')*\sin(t-2T/6-T0) +$$
$$a4'*\sin(t-T/2-3T/6-T0) +$$
$$(a4'+a1'-a2')*\sin(t-4T/6-T0)$$

Formula 11 may be further reorganized as shown in the below Formula 12, for example.

$$S1'+S2'+S3'+S4'+S5' = a1'* \quad \text{Formula 12}$$
$$(\sin(t-T0) + \sin(t-2T/6-T0) + \sin(t-4T/6-T0)) +$$
$$a2'*(\sin(t-T/2-T/6-T0) - \sin(t-4T/6-T0)) +$$
$$a4'*(\sin(t-2T/6-T0) +$$
$$\sin(t-T/2-3T/6-T0) + \sin(t-4T/6-T0))$$

Since, in Formula 12, respective sine wave expressions for each of the output transient characteristic amplitudes a1', a2', and a4' will respectively cancel each other out to equal 0, the respective sine wave expressions of Formula 12 may be separately expressed using Formula 13 to Formula 15, described below.

$$\sin(t-T0)+\sin(t-2T/6-T0)+\sin(t-4T/6-T0)=0 \quad \text{Formula 13}$$

$$\sin(t-T/2-T/6-T0)-\sin(t-4T/6-T0)=0 \quad \text{Formula 14}$$

$$\sin(t-2T/6-T0)+\sin(t-T/2-3T/6-T0)+\sin(t-4T/6-T0)=0 \quad \text{Formula 15}$$

Thus, as shown with reference to Formula 13 to Formula 15, the respective sums of the respective sine wave expressions may each be equal to 0, regardless of the corresponding amplitudes a1', a2', a3', a4', and a5' of the corresponding output transient characteristic waveforms, thus suppressing vibrations. Accordingly, Formulas 5-15 further demonstrate that when the constraints of Formulas 1 and 2 are implemented when applying or setting the conversion codes CC and/or when generating the analog current signal by the digital-to-analog converter, e.g., based on correspondingly determined/set changes or difference codes a1 through a5 and regardless of the values of the difference codes a1 through a5, vibrations of the VCM actuator may be suppressed.

Accordingly, as confirmed by the above discussion regarding FIGS. 6, 7, and 8, and with the example constraints of Formulas 1 and 2, by applying a driving current sequentially generated or built according to the example conversion codes CC, such as further through the corresponding first through fifth difference codes a1-a5, the VCM actuator may settle quickly to a target value with substantially reduced or suppressed output characteristic vibrations.

As described above, in a case in which the driving signal, or the ultimate sequenced or composite signal, is provided to the VCM actuator, and a specific period of time has passed, vibrations of the VCM actuator may be suppressed, as illustrated in FIG. 8.

For example, compared to the case illustrated in FIG. 5, where the amount of time before vibrations of the VCM actuator subside is great, in the example of FIG. 8, the specific period of time is provided as a period of time (T0+(4/6)T), where time T0 corresponds to when the driving signal according to the first current increase code or current reduction code is provided and time T4 corresponds to the time when the final current increase code or current reduction code is provided. For example, in a case in which a natural vibration period T of the VCM actuator is provided as 10 msec, and an example T0 is 5 msec, the specific settling period of time may be provided as about 11.667 msec, e.g., at 4/6T and within the period of the natural vibration of the VCM beginning at T0.

Figure 9:
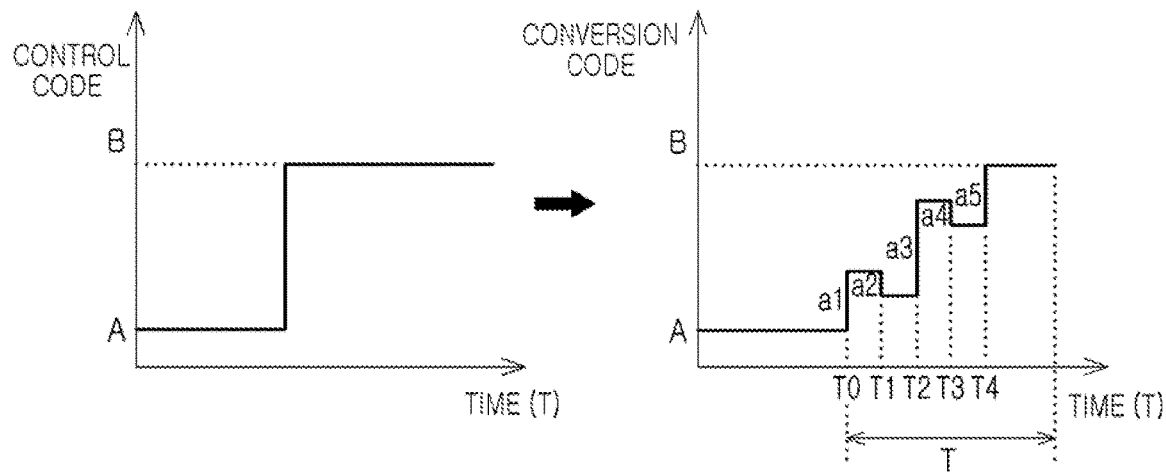
FIG. 9 is a first graph for a control code and conversion codes according to an example.

FIG. 9 is a first graph for a control code and conversion codes according to an example.

With reference to FIG. 9, in a case in which a conversion code CC includes a starting conversion code C0, a first conversion code C1, a second conversion code C2, a third conversion code C3, a fourth conversion code C4, and a fifth conversion code C5 during a period of time T, the first conversion code C1, the second conversion code C2, the third conversion code C3, the fourth conversion code C4, and the fifth conversion code C5 may respectively correspond to a current increase code value, a current reduction code value, a current increase code value, a current reduction code value, and a current increase code value, in sequence.

In an example, a case in which the vibration period of time T of an actuator is 10 ms is taken as an example. A target code (corresponding to a difference between a first control code SC1 and an initial code SC0 may be normalized to be 1. Based on Formula 4, normalized values of a first difference code $a1$, a second difference code $a2$, a third difference code $a3$, a fourth difference code $a4$, and a fifth difference code $a5$ may respectively be set. For example, the first difference code $a1$, the second difference code $a2$, and the fourth difference code $a4$ may be set to be $a1=0.4$, $a2=0.2$, and $a4=0.2$, e.g., based on the correspondingly aforementioned preset conversion codes CC. Here, the third difference code $a3$ and the fifth difference code $a5$ may respectively be set to be $a3=0.6$ and $a5=0.4$, e.g. based on the correspondingly aforementioned preset conversion codes CC and conforming with the example constraints of Formulas 1 and 2. As noted above, the period of time T may be provided as a natural vibration period of the actuator, and may be predetermined or estimated based on known characteristics of the actuator, or looked up in a look up table, for example.

In a case in which $3*a1-2*a2+a4$ is calculated based on Formula 4, the result is 1, and the corresponding change code (C5-CO) value has a normalized value. Accordingly, it can be determined that vibrations may be removed, as demonstrated in Formulas 5 through 15, described above.

Figure 10:
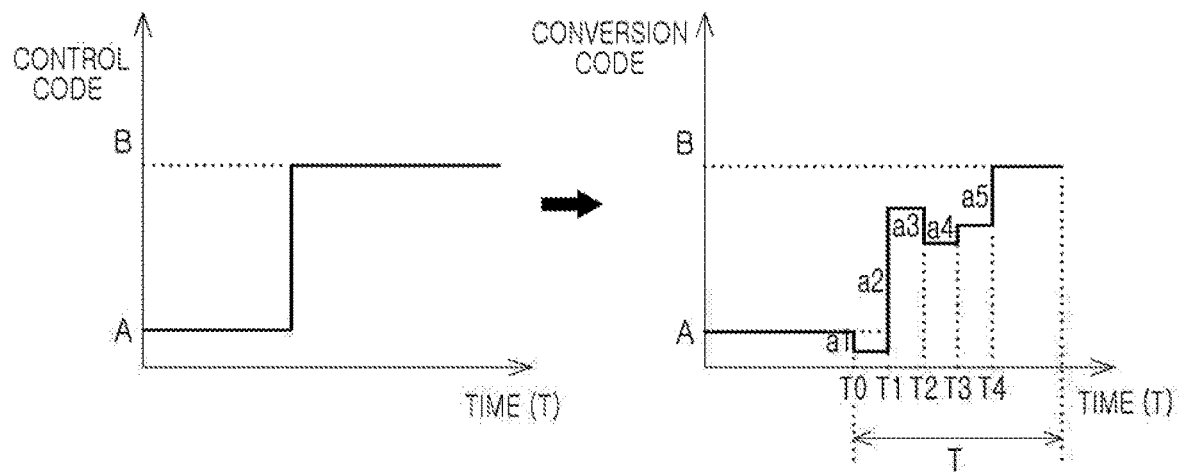
FIG. 10 is a second graph for a control code and conversion codes according to an example.

FIG. 10 is a second graph for a control code and conversion codes according to an example.

With reference to FIG. 10, in a case in which the applied conversion codes CC include a starting conversion code C0, a first conversion code C1, a second conversion code C2, a third conversion code C3, a fourth conversion code C4, and a fifth conversion code C5 during a period of time T, the first conversion code C1, the second conversion code C2, the third conversion code C3, the fourth conversion code C4, and the fifth conversion code C5 may be provided as a current reduction code value, a current increase code value, a current reduction code value, a current increase code value, and a current increase code value, in sequence, respectively.

In an example, where at least one conversion code, among the plurality of conversion codes CC, would result in a code value lower than a range between the control codes CS0 and CS1, i.e., below the illustrated A value representing the value of control code SC0, vibrations may be suppressed if normalized values of a first difference code $a1$, a second difference code $a2$, a third difference code $a3$, a fourth difference code $a4$, and a fifth difference code $a5$ by a target code (SC1-SC0) are set so that $a1=-0.1$, $a2=-0.7$, and $a4=-0.1$, e.g., based on the correspondingly aforementioned preset conversion codes CC, and so that the third difference code $a3$ may be set to $-0.2$ and the fifth difference code $a5$ may be set to 0.5, e.g., based on the correspondingly aforementioned preset conversion codes CC and conforming with the example constraints of Formulas 1 and 2.

In a case in which the expression $3*a1-2*a2+a4$ is calculated based on Formula 4, the result is 1, and the corresponding change code (C5-CO) value has a normalized value. Therefore, vibrations of the actuator may be suppressed, as demonstrated above with respect to Formulas 5 through 15.

Figure 11:
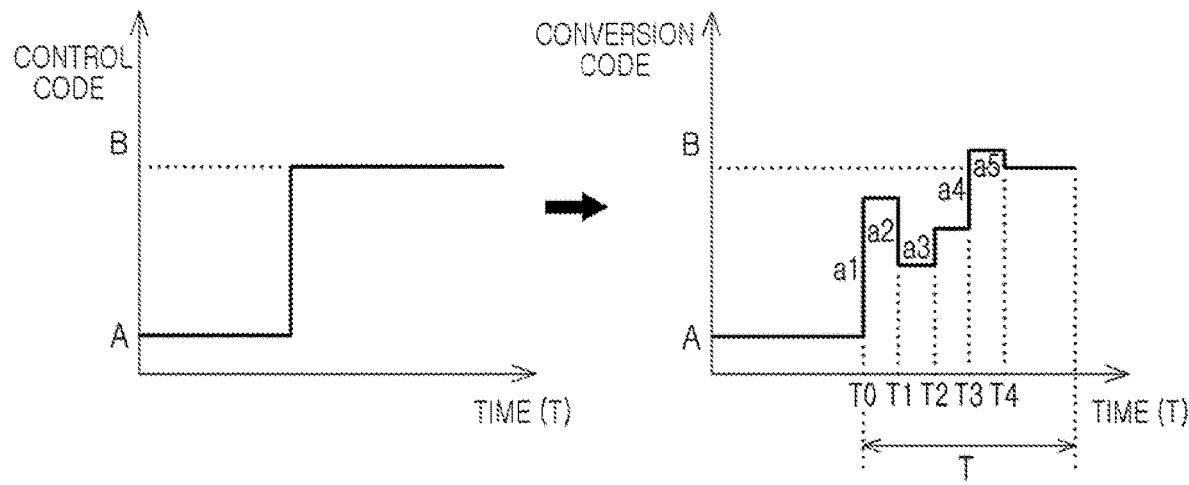
FIG. 11 is a third graph for a control code and conversion codes according to an example.

FIG. 11 is a third graph for a control code and conversion codes according to an example.

With reference to FIG. 11, in a case in which the applied conversion codes CC include a starting conversion code C0, a first conversion code C1, a second conversion code C2, a third conversion code C3, a fourth conversion code C4, and a fifth conversion code C5 during a period of time T, the first conversion code C1, the second conversion code C2, the third conversion code C3, the fourth conversion code C4, and the fifth conversion code C5 may be provided as a current increase code value, a current reduction code value, a current increase code value, a current increase code value, and a current reduction code value, in sequence, respectively.

In an example, in a case in which at least one conversion code, among the plurality of conversion codes CC, has a code value higher than a range of a control code, e.g., greater than the value of control code SC1 and represented by the illustrated B in FIG. 11, vibrations may be suppressed if normalized values of a first difference code $a1$, a second difference code $a2$, a third difference code $a3$, a fourth difference code $a4$, and a fifth difference code $a5$ by a target code (SC1-SC0) are set so that $a1=0.7$, $a2=0.3$, and $a4=-0.5$, e.g., based on the correspondingly aforementioned preset conversion codes CC, and so the third difference code $a3$ may be 0.2 and $a5$ may be $-0.1$, e.g., based on the correspondingly aforementioned preset conversion codes CC and conforming with the example constraints of Formulas 1 and 2.

In a case in which $3*a1-2*a2+a4$ is calculated based on Formula 4, the result is 1, and the corresponding change code (C5-CO) value has a normalized value. Therefore, vibrations may be removed, as demonstrated by the above described Formulas 5 through 15.

Figure 12:
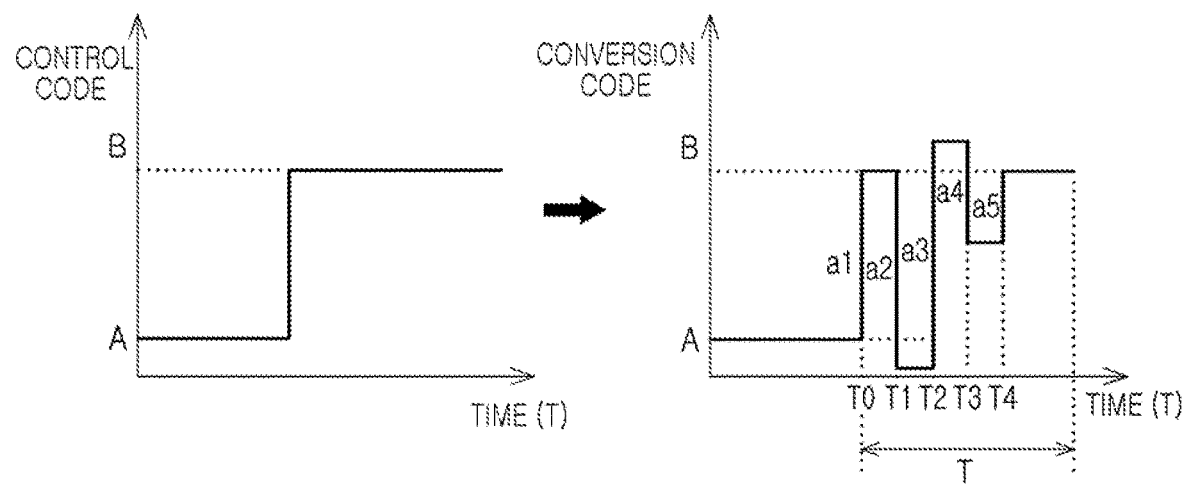
FIG. 12 is a graph for a control code and conversion codes related to the graph of FIG. 9.

FIG. 12 is a graph for a control code and conversion codes related to the graph of FIG. 9. With reference to FIGS. 9 and 12, in an example, in a case in which at least one conversion code, among the plurality of conversion codes CC, has a code value lower than the value range represented by the control codes SC0 and SC1, vibrations may be suppressed if normalized values of a first difference code $a1$, a second difference code $a2$, a third difference code $a3$, a fourth difference code $a4$, and a fifth difference code $a5$ by a target code (SC1-SC0) are set so that $a1=1$, $a2=1.5$, and $a4=1$, e.g., based on the correspondingly aforementioned preset conversion codes CC, and so the third difference code $a3$ may be 2 and $a5$ may be 0.5, e.g., based on the correspondingly aforementioned preset conversion codes CC and conforming with the example constraints of Formulas 1 and 2.

In a case in which $3*a1-2*a2+a4$ is calculated based on Formula 4, the result is 1, and the corresponding change code (C5-CO) value has a normalized value. Therefore, it can be determined that vibrations may be removed, such as demonstrated above in Formulas 5 through 15.

Though respective examples have been described where the conversion code CC includes an initial conversion code C0 and a first conversion code C1 through a fifth conversion code C5, it is noted that such examples are for the sake of convenience of explanation, and embodiments are not limited thereto. For example, there may be additional or less conversion codes, or such staggered increasing of driving signal, e.g., with at least one decrement, or staggered decreasing of driving signal, e.g., with at least one increase, may be implemented without use of conversion codes.

Figure 13:
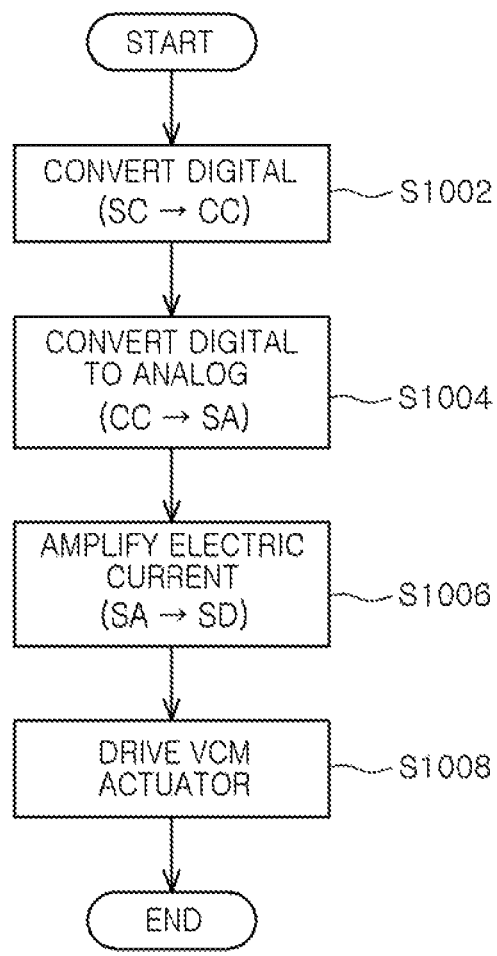
FIG. 13 is a flowchart of a method of driving a VCM actuator according to an example.

FIG. 13 is a flowchart of a method of driving a VCM actuator according to an example.

Hereinafter, descriptions of any one, any combination, or all of the above operations of a VCM actuator with reference to FIGS. 1 to 12 may also be applicable and implemented in a method of driving the VCM actuator, according to varying examples, though noting that embodiments are also not limited thereto. Thus, in view of such above method descriptions, some overlapping descriptions for the example method of FIG. 13 for driving the VCM actuator may be omitted in the below discussion of the example method of FIG. 13.

In operation S1002, a digital converter 100 may convert a received control code SC into a plurality of conversion codes CC, e.g., including a starting conversion code C0 and a first conversion code C1 through an nth conversion code Cn, where n is a natural number of 2 or more, for application through of a corresponding driving current to the VCM actuator over a predetermined period of time T. The conversion codes may be generated all at once or may be generated in a sequence, such as in a sequence within the example period of time T.

The first conversion code C1 through the nth conversion code Cn, among the plurality of conversion codes CC, may have code values different from that of the starting conversion code C0.

In an example, the first conversion code C1 through the nth conversion code Cn, among the plurality of conversion codes CC, may include a current increase code value increasing a level of a VCM driving current and a current reduction code value decreasing a level of a VCM driving current. Here, the driving current corresponding to the first conversion code C1 through the nth conversion code Cn, among the plurality of conversion codes CC, may be provided as a current different from a starting current corresponding to the starting conversion code C0.

Subsequently, in operation S1004, the plurality of conversion codes CC may be converted into an analog signal SA in a digital-to-analog converter 200.

Subsequently, in S1006, the resulting driving signal SD may be generated in such a manner that an electric current of the analog signal SA is amplified in a current amplifier 300. When an increasing of an overall current is performed to reach a target position, the driving signal SD may be generated to include at least one decrease in current, e.g., based on a reduction or decrementing code, and when an decreasing of an overall current is performed to reach a target position, the driving signal SD may be generated to include at least one increase in current, e.g., based on an increase code.

In S1008, the driving signal SD is provided to the VCM actuator to drive the VCM actuator, and a lens position adjusted according to position changes of the lens(es) caused by the actuation of the VCM actuator.

As set forth above, according to examples, an actuator driver for a VCM may be provided to suppress unique vibration characteristics of a VCM actuator and allow lens(es) to be disposed quickly and stably to a target position by the VCM actuator, with improved vibration response characteristics of position movement of the lens(es) and a corresponding auto focus function of the corresponding camera module.

The actuator driver system 150, digital converter 100, digital-to-analog converter 200, current amplifier 300, and VCM actuator 400 in FIG. 1 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-13 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An actuator driver for a voice coil motor (VCM), comprising:
   a digital converter configured to convert a VCM driving control code into a plurality of conversion codes including at least a first to nth conversion codes, during a predetermined period of time;
   a digital-to-analog converter configured to sequentially generate an analog signal according to each of the plurality of conversion codes during the predetermined time to actuate a VCM actuator to a target position; and
   a current amplifier configured amplify the analog signal to generate a driving signal and provide the driving signal to the VCM actuator,
   wherein the sequential generation of the analog signal includes increasing a level of the analog signal in response to one of the conversion codes and decreasing a level of the analog signal in response to another one of the conversion codes, where at least two decreases of the level of the analog signal are decreases of different amounts.

2. An actuator driver for a voice coil motor (VCM), comprising:
   a digital converter configured to convert a VCM driving control code into a plurality of conversion codes including at least a first to nth conversion codes, during a predetermined period of time;
   a diqital-to-analoq converter configured to sequentially generate an analog signal according to each of the plurality of conversion codes during the predetermined time to actuate a VCM actuator to a target position; and
   a current amplifier configured amplify the analog signal to generate a driving signal and provide the driving signal to the VCM actuator,
   wherein the sequential generation of the analog signal includes increasing a level of the analog signal in response to one of the conversion codes and decreasing a level of the analog signal in response to another one of the conversion codes, and
   wherein the digital converter is further configured to convert the VCM driving control code into the starting conversion code when the VCM driving control code is maintained from a previous actuation, and configured to convert the VCM driving control code into the first to nth conversion codes when the VCM driving control code changes,
   where each of the first to nth conversion codes has a code value different from a code value of the starting conversion code.

3. The actuator driver of claim 2, wherein the plurality of conversion codes include a first conversion code, a second conversion code, a third conversion code, a fourth conversion code, and a fifth conversion code,
   wherein, in the digital-to-analog converter, provision times of the first conversion code, the second conversion code, the third conversion code, the fourth conversion code, and the fifth conversion code are provided as T0, T1, T2, T3, and T4, respectively,
   wherein a difference between the first conversion code and the starting conversion code is set as a first difference code a1, a difference between the first conversion code and the second conversion code is set as a second difference code a2, a difference between the third conversion code and the second conversion code is set as a third difference code a3, a difference between the third conversion code and the fourth conversion code is set as a fourth difference code a4, and a difference between the fifth conversion code and the fourth conversion code is set as a fifth difference code a5, and wherein relationships among the first through fifth difference codes are set according to the expressions:

$a3=a1+a4;$ $a5=a4+a1-a2;$ $a1-a2+a3-a4+a5=$ a target code corresponding to the target position−the starting conversion code; and $3*a1-2*a2+a4=$ the target code−the starting conversion code.

4. The actuator driver of claim 1, wherein the first through nth conversion codes are at least one of a current increase code, controlling an increasing of a level of the analog signal, and a current reduction code, controlling a reducing of a level of the analog signal, and
wherein a conversion code is the current increase code when a value of the conversion code is greater than a value of an immediately previous conversion code, and the conversion code is the current reduction code when the value of the conversion code is less than the value of the immediately previous conversion code.

5. The actuator driver of claim 4,
wherein the plurality of conversion codes include the first conversion code, the second conversion code, the third conversion code, the fourth conversion code, and the fifth conversion code,
wherein the first conversion code, the third conversion code, and the fifth conversion code are current increase codes, and the second conversion code and fourth conversion code are current reduction codes, and
wherein the digital-to-analog converter generates the analog signal according to the first conversion code, the second conversion code, the third conversion code, the fourth conversion code, and the fifth conversion code, in sequence, during the predetermined time.

6. The actuator driver of claim 5, wherein, when a difference between the first conversion code and a starting conversion code is a first difference a1, a difference between the first conversion code and the second conversion code is a2, a difference between the third conversion code and the second conversion code is a3, a difference between the third conversion code and the fourth conversion code is a4, and a difference between the fifth conversion code and the fourth conversion code is a5, relationships among the a1, a2, a3, a4, and a5 are constrained according to the expressions:

$a3=a1+a4;$ and $a5=a4+a1-a2.$

7. The actuator driver of claim 4,
wherein the plurality of conversion codes include the first conversion code, the second conversion code, the third conversion code, the fourth conversion code, and the fifth conversion code,
the first conversion code and the third conversion code are current reduction codes, and the second conversion code, the fourth conversion code, and the fifth conversion code are current increase codes, and
wherein the digital-to-analog converter generates the analog signal according to the first conversion code, the second conversion code, the third conversion code, the fourth conversion code, and the fifth conversion code, in sequence, during the predetermined time.

8. The actuator driver of claim 7, wherein, when a difference between the first conversion code and a starting conversion code is a1, a difference between the first conversion code and the second conversion code is a2, a difference between the third conversion code and the second conversion code is a3, a difference between the third conversion code and the fourth conversion code is a4, and a difference between the fifth conversion code and the fourth conversion code is a5, relationships among the a1, a2, a3, a4, and a5 are constrained according to the expressions:

$a3=a1+a4;$ and $a5=a4+a1-a2.$

9. The actuator driver of claim 4,
wherein the plurality of conversion codes include the first conversion code, the second conversion code, the third conversion code, the fourth conversion code, and the fifth conversion code;
the first conversion code, the third conversion code, and the fourth conversion code are current increase codes, and the second conversion code and the fifth conversion code are current reduction codes, and
wherein the digital-to-analog converter generates the analog signal according to the first conversion code, the second conversion code, the third conversion code, the fourth conversion code, and the fifth conversion code, in sequence, during the predetermined time.

10. The actuator driver of claim 9, wherein, when a difference between the first conversion code and a starting conversion code is a1, a difference between the first conversion code and the second conversion code is a2, a difference between the third conversion code and the second conversion code is a3, a difference between the third conversion code and the fourth conversion code is a4, and a difference between the fifth conversion code and the fourth conversion code is a5, relationships among the a1, a2, a3, a4, and a5 are constrained according to the expressions:

$a3=a1+a4;$ and $a5=a4+a1-a2.$

11. An actuator driver for a voice coil motor (VCM), comprising:
a digital converter configured to convert a VCM driving control code into a plurality of conversion codes including at least a first to nth conversion codes, during a predetermined period of time;
a digital-to-analog converter configured to sequentially generate an analog signal according to each of the plurality of conversion codes to finally actuate a VCM actuator to a target position within the predetermined time, where the first conversion code corresponds to an initial analog signal generated by the digital-to-analog converter to actuate the VCM actuator; and
a current amplifier configured amplify the analog signal to generate a driving signal and provide the driving signal to the VCM actuator,
wherein the sequential generation of the analog signal includes increasing a level of the analog signal in response to one of the conversion codes and decreasing a level of the analog signal in response to another one of the conversion codes, and wherein the predetermined period of time is a period of a natural vibration of the VCM actuator.

12. The actuator driver of claim 1, further comprising the VCM actuator.

13. A method of driving a VCM actuator, comprising:
converting a VCM driving control code into a plurality of conversion codes including at least first through nth conversion codes, during a predetermined period of time;
sequentially generating an analog signal according to each of the plurality of -conversion codes during the predetermined period of time to actuate a VCM actuator to a target position; and
providing a driving signal to the VCM actuator after the driving signal is generated by an amplifying of the analog signal to generate the driving signal,
wherein the sequential generation of the analog signal includes increasing a level of the analog signal in response to one of the conversion codes and decreasing a level of the analog signal in response to another one of the conversion codes, where at least two decreases of the level of the analog signal are decreases of different amounts.

14. The method of claim 13, wherein the converting of the VCM driving control code includes converting the VCM driving control code into a starting conversion code when the VCM driving control code is maintained from a previous actuation, and converting the VCM driving control code into the first to nth conversion codes when the VCM driving control code changes, where each of the first to nth conversion codes has a code value different from a code value of the starting conversion code.

15. The method of claim 14, wherein the plurality of conversion codes include a first conversion code, a second conversion code, a third conversion code, a fourth conversion code, and a fifth conversion code,
wherein, in the converting of the VCM driving control code, provision times of the first conversion code, the second conversion code, the third conversion code, the fourth conversion code, and the fifth conversion code are provided as T0, T1, T2, T3, and T4, respectively,
wherein a difference between the first conversion code and the starting conversion code is set as a first difference code a1, a difference between the first conversion code and the second conversion code is set as a second difference code a2, a difference between the third conversion code and the second conversion code is set as a third difference code a3, a difference between the third conversion code and the fourth conversion code is set as a fourth difference code a4, and a difference between the fifth conversion code and the fourth conversion code is set as a fifth difference code a5, and
wherein relationships among the first through fifth difference codes are set according to the expressions:

$a3=a1+a4;$ $a5=a4+a1-a2;$ $a1-a2+a3-a4+a5=$ a target code corresponding to the target position−the starting conversion code; and $3*a1-2*a2+a4=$ the target code−the starting conversion code.

16. The method of claim 13, wherein the first through nth conversion codes are at least one of a current increase code, controlling an increasing of a level of the analog signal, and a current reduction code, controlling a reducing of a level of the analog signal, and
wherein a conversion code is the current increase code when a value of the conversion code is greater than a value of an immediately previous conversion code, and the conversion code is the current reduction code when the value of the conversion code is less than the value of the immediately previous conversion code.

17. The method of claim 16,
wherein the plurality of conversion codes include the first conversion code, the second conversion code, the third conversion code, the fourth conversion code, and the fifth conversion code,
wherein the first conversion code, the third conversion code, and the fifth conversion code are current increase codes, and the second conversion code and fourth conversion code are current reduction codes, and
wherein the converting of the VCM driving control code includes generating the analog signal according to the first conversion code, the second conversion code, the third conversion code, the fourth conversion code, and the fifth conversion code, in sequence, during the predetermined time.

18. The method of claim 17, wherein, when a difference between the first conversion code and a starting conversion code is a1, a difference between the first conversion code and the second conversion code is a2, a difference between the third conversion code and the second conversion code is a3, a difference between the third conversion code and the fourth conversion code is a4, and a difference between the fifth conversion code and the fourth conversion code is a5, relationships among the a1, a2, a3, a4, and a5 are constrained according to the expressions:

$a3=a1+a4;$ and $a5=a4+a1-a2.$

19. The method of claim 16,
wherein the plurality of conversion codes include the first conversion code, the second conversion code, the third conversion code, the fourth conversion code, and the fifth conversion code,
wherein the first conversion code and the third conversion code are current reduction codes, and the second conversion code, the fourth conversion code, and the fifth conversion code are current increase codes, and
wherein the converting of the VCM driving control code includes generating the analog signal according to the first conversion code, the second conversion code, the third conversion code, the fourth conversion code, and the fifth conversion code, in sequence, during the predetermined time.

20. The method of claim 19, wherein, when a difference between the first conversion code and a starting conversion code is a1, a difference between the first conversion code and the second conversion code is a2, a difference between the third conversion code and the second conversion code is a3, a difference between the third conversion code and the fourth conversion code is a4, and a difference between the fifth conversion code and the fourth conversion code is a5, relationships among the a1, a2, a3, a4, and a5 are constrained according to the expressions:

$a3=a1+a4;$ and $a5=a4+a1-a2.$

21. The method of claim 16, wherein the plurality of conversion codes include the first conversion code, the second conversion code, the third conversion code, the fourth conversion code, and the fifth conversion code,
wherein the first conversion code, the third conversion code, and the fourth conversion code are current increase codes, and the second conversion code and the fifth conversion code are current reduction codes, and
wherein the converting of the VCM driving control code includes generating the analog signal according to the first conversion code, the second conversion code, the third conversion code, the fourth conversion code, and the fifth conversion code, in sequence, during the predetermined time.

22. The method of claim 21, wherein, when a difference between the first conversion code and a starting conversion code is a$1$, a difference between the first conversion code and the second conversion code is a$2$, a difference between the third conversion code and the second conversion code is a$3$, a difference between the third conversion code and the fourth conversion code is a$4$, and a difference between the fifth conversion code and the fourth conversion code is a$5$, relationships among the a$1$, a$2$, a$3$, a$4$, and a$5$ are constrained according to the expressions:

$$a3=a1+a4; \text{ and}$$

$$a5=a4+a1-a2.$$

23. The method of claim 13,
wherein the sequential generating of the analog signal according to each of the plurality of conversion codes during the predetermined period of time includes sequentially generating the analog signal according to each of the plurality of conversion codes to finally actuate the VCM actuator to the target position within the predetermined time, and
wherein the predetermined period of time is a period of a natural vibration of the VCM actuator.

24. A non-transitory computer-readable storage medium storing instructions that, when executed by a processor, cause the processor to perform the method of claim 13.

25. An actuator driver for a voice coil motor (VCM), comprising:
a digital-to-analog converter configured to, in response to a VCM current control value, sequentially generate an analog signal according to each of a plurality of VCM driving current values respectively derived based on the VCM current control value, during a predetermined time to actuate a VCM actuator to a target position; and
a current amplifier configured amplify the analog signal to generate a driving signal and provide the driving signal to the VCM actuator,
wherein, the sequential generation of the analog signal includes increasing a level of the analog signal in response to one of the VCM driving current values and decreasing a level of the analog signal in response to another of the VCM driving current values during the predetermined time, where at least two decreases of the level of the analog signal are decreases of different amounts.

26. The actuator driver of claim 25,
wherein the predetermined time is a period of a natural transient of the VCM actuator, and
wherein output transient characteristics of the VCM actuator become zeroed out by the provided driving signal before expiration of a first period T of the natural transient of the VCM actuator immediately after an initial time T$0$ when the driving signal is provided to the VCM actuator in response to the VCM current control value.

27. The actuator driver of claim 26, wherein the plurality of VCM driving current values are generated during the predetermined time in T/$6$ intervals, so the output transient characteristics of the VCM actuator become zeroed out before a time 5T/$6$ after T$0$.

28. The actuator driver of claim 25, further comprising a digital converter configured to generate from the VCM current control value the plurality of VCM driving current values during the predetermined time, including generating a first conversion value, a second conversion value, a third conversion value, a fourth conversion value, and a fifth conversion value,
wherein, when a difference between the first conversion value and the immediately previous value of the VCM current control value is a$1$, a difference between the first conversion value and the second conversion value is a$2$, a difference between the third conversion value and the second conversion value is a$3$, a difference between the third conversion value and the fourth conversion value is a$4$, and a difference between the fifth conversion value and the fourth conversion value is a$5$, relationships among the a$1$, a$2$, a$3$, a$4$, and a$5$ are constrained based on the expressions:

$$a3=a1+a4; \text{ and}$$

$$a5=a4+a1-a2.$$

29. The actuator driver of claim 1, wherein the digital converter is further configured to convert the VCM driving control code into a starting conversion code,
wherein the plurality of conversion codes include a first conversion code, a second conversion code, a third conversion code, a fourth conversion code, and a fifth conversion code,
wherein, in the digital-to-analog converter, provision times of the first conversion code, the second conversion code, the third conversion code, the fourth conversion code, and the fifth conversion code are provided as T$0$, T$1$, T$2$, T$3$, and T$4$, respectively,
wherein a difference between the first conversion code and the starting conversion code is set as a first difference code a$1$, a difference between the first conversion code and the second conversion code is set as a second difference code a$2$, a difference between the third conversion code and the second conversion code is set as a third difference code a$3$, a difference between the third conversion code and the fourth conversion code is set as a fourth difference code a$4$, and a difference between the fifth conversion code and the fourth conversion code is set as a fifth difference code a$5$, and
wherein relationships among the first through fifth difference codes are set according to the expressions:

$$a3=a1+a4;$$

$$a5=a4+a1-a2;$$

$$a1-a2+a3-a4+a5=\text{a target code corresponding to the target position}-\text{the starting conversion code; and}$$

$$3*a1-2*a2+a4=\text{the target code}-\text{the starting conversion code}.$$

30. The actuator driver of claim 11, wherein the digital converter is further configured to convert the VCM driving control code into a starting conversion code,
- wherein the plurality of conversion codes include a first conversion code, a second conversion code, a third conversion code, a fourth conversion code, and a fifth conversion code,
- wherein, in the digital-to-analog converter, provision times of the first conversion code, the second conversion code, the third conversion code, the fourth conversion code, and the fifth conversion code are provided as T0, T1, T2, T3, and T4, respectively,
- wherein a difference between the first conversion code and the starting conversion code is set as a first difference code a1, a difference between the first conversion code and the second conversion code is set as a second difference code a2, a difference between the third conversion code and the second conversion code is set as a third difference code a3, a difference between the third conversion code and the fourth conversion code is set as a fourth difference code a4, and a difference between the fifth conversion code and the fourth conversion code is set as a fifth difference code a5, and wherein relationships among the first through fifth difference codes are set according to the expressions:

$$a3=a1+a4;$$

$$a5=a4+a1-a2;$$

$$a1-a2+a3-a4+a5=\text{a target code corresponding to the target position-the starting conversion code;}$$

and $$3*a1-2*a2+a4=\text{the target code-the starting conversion code.}$$

31. The actuator driver of claim 11,
- wherein the plurality of conversion codes include a first conversion code, a second conversion code, a third conversion code, a fourth conversion code, and a fifth conversion code, and
- wherein, when a difference between the first conversion code and a starting conversion code is a first difference a1, a difference between the first conversion code and the second conversion code is a2, a difference between the third conversion code and the second conversion code is a3, a difference between the third conversion code and the fourth conversion code is a4, and a difference between the fifth conversion code and the fourth conversion code is a5, relationships among the a1, a2, a3, a4, and a5 are constrained according to the expressions:

$$a3=a1+a4; \text{ and}$$

$$a5=a4+a1-a2.$$

32. The actuator driver of claim 11,
- wherein the plurality of conversion codes include a first conversion code, a second conversion code, a third conversion code, a fourth conversion code, and a fifth conversion code, and,
- the first conversion code and the third conversion code are current reduction codes, and the second conversion code, the fourth conversion code, and the fifth conversion code are current increase codes, and
- wherein the digital-to-analog converter generates the analog signal according to the first conversion code, the second conversion code, the third conversion code, the fourth conversion code, and the fifth conversion code, in sequence, during the predetermined time.

33. The actuator driver of claim 11,
- wherein the plurality of conversion codes include a first conversion code, a second conversion code, a third conversion code, a fourth conversion code, and a fifth conversion code;
- the first conversion code, the third conversion code, and the fourth conversion code are current increase codes, and the second conversion code and the fifth conversion code are current reduction codes, and
- wherein the digital-to-analog converter generates the analog signal according to the first conversion code, the second conversion code, the third conversion code, the fourth conversion code, and the fifth conversion code, in sequence, during the predetermined time.

* * * * *